UNITED STATES PATENT OFFICE.

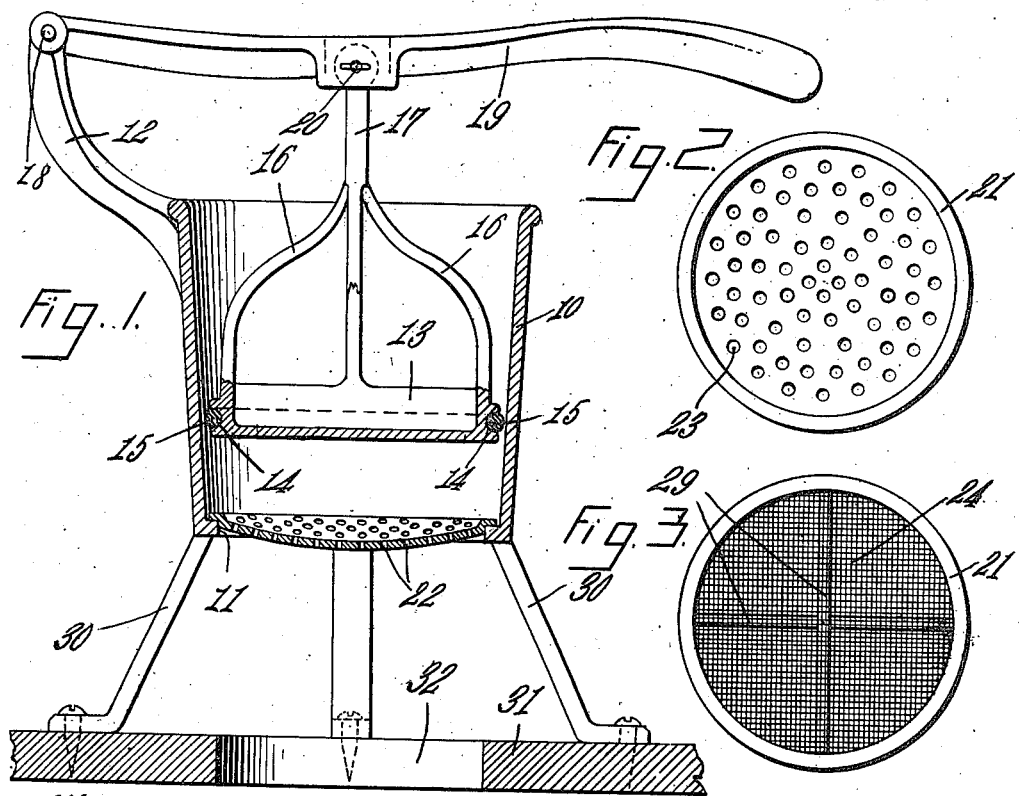

WILLIAM H. GEBAUER, OF ST. LOUIS, MISSOURI.

VEGETABLE-CUTTER.

965,384.  Specification of Letters Patent.  Patented July 26, 1910.

Application filed July 23, 1909. Serial No. 509,167.

*To all whom it may concern:*

Be it known that I, WILLIAM H. GEBAUER, a citizen of the United States, residing at St. Louis, in the State of Missouri, have invented certain new and useful Improvements in Vegetable-Cutters; and I do hereby declare the following to be a full, clear, and exact description of the invention, such as will enable others skilled in the art to which it appertains to make and use the same.

This invention relates to devices employed for cutting, crushing or pressing vegetables, fruits, and for similar purposes, and has for one of its objects to improve the construction and increase the efficiency and utility of devices of this character.

With this and other objects in view, the invention consists in certain novel features of construction as hereafter shown and described and then specifically pointed out in the claims, and in the drawings illustrative of the preferred embodiment of the invention, Figure 1 is a vertical sectional view of the improved device. Figs. 2, 3, 4, 5, and 6 are plan views of the various forms of the removable members through which the various fruits or vegetables are forced and by which they are divided or crushed. Fig. 7 is a view of the plate which will be employed when the improved device is employed for pressing products or substances. Fig. 8 is a sectional view of the member which will be employed when the improved device is used as a sausage stuffer and for like purposes.

The improved device comprises a body 10, preferably circular and with its side walls slightly converging toward the lower end, as shown in Fig. 1. At its lower end the body 10 is provided with an inwardly directed rib or flange 11, and with a bracket 12 rising from the upper portion at one side.

Arranged for operation within the member 10 is a plunger 13 having an encircling channel 14 at its lower end to receive a packing member 15, the latter being preferably of rubber or like material, and operating relatively close to the side walls of the member 10. The members 13—15 are so arranged that the member 15 engages the inner walls of the member 10 closely at its lower end, so that the vegetables, fruits, or other products within the member 10 will be forced downwardly by the operation of the plunger, as hereafter explained.

Rising from the plunger 13 are inwardly converging arms 16, which terminate centrally of the member 10 in a stem 17. Pivoted at 18 to the bracket 12 is an operating lever 19, the lever being pivoted at 20 to the stem 17. By this means it will be understood that the operation of the lever will cause the requisite movement to the plunger.

The flange 11 is designed to support the members through which the fruits, vegetables, or other products are forced by the operation of the plunger, and a variety of these devices are provided with each of the members 10, and in Figs. 2 to 8 inclusive, are shown a number of these members. Each of the members from 2 to 6, and likewise the member within the cylindrical structure 10, are formed with an annular flange 21 which bears upon the supporting flange 11, while the intermediate portion is provided with relatively fine apertures 22, coarser apertures 23, wire netting 24, relative fine transversely arranged cutting blades 25, spaced cutting blades 26, or relatively coarsely arranged cutting blades 27, as shown in the various figures from 1 to 6 inclusive. The member shown in Fig. 1 is designed to be employed when the product is to be finely divided, while the larger apertures 23 shown in Fig. 2 will be employed when the material is to be closely divided. The structure 24 is of wire netting which will be employed for some products while the structure 25 and 27 will be employed when still coarser divisions of the product are desired. The structure 26 enables the product to be divided into long thin slices, while the imperforate member 33 will be employed when the material is simply to be compressed. In Fig. 8 the device is shown which will be employed in manufacturing sausage and like products. Each of the various devices, as before noted, are designed to bear upon the flange 11, and are interchangeable without structural changes in any of the parts. The structure shown in Fig. 3 being somewhat weak, will be strengthened by cross-bars 29, as shown.

The improved device may thus be employed for slicing potatoes, crushing fruits for producing fruit juices of various kinds, crushing or dividing lemons in manufacturing lemonade. The structure shown in Fig. 3 will be found convenient for straining honey, crushing fruits for manufacturing wines and jellies and the like. The structure shown in Fig. 2 will be found convenient for crushing fruits for producing fruit juices, and crushing lemons for lemonade. The structure shown in Fig. 4 is designed for cutting potatoes for producing what is known as "French fry," while the structure shown in Fig. 5 is employed for slicing potatoes and for similar purposes. The structure shown in Fig. 6 will be found of advantage in cutting up turnips and similar vegetables.

The packing member 15 being of compressible material will bear against the inner walls of the member 10 as the plunger approaches the lower end of the member and will be compressed as the plunger moves downward and thus the pressure against the yieldable member will increase as the plunger approaches the flange 11 and the divided member supported thereon, so that the material being acted upon will be effectually prevented from escaping upwardly past the plunger, as the increase of pressure against the material will correspondingly increase the grip of the member 15 against the member 10, and thus cause the member 15 to automatically adapt itself to the conditions under which it operates.

The improved device is simple in construction, with the parts easily separable for cleansing after each operation. The parts are entirely of metal and galvanized or otherwise coated or treated to prevent corrosion. The member 10 is mounted upon supporting legs 30, and may be attached to a table or like support 31, the latter preferably provided with an aperture 32 through which the product from the various parts will pass, or into which a receiving vessel may be inserted.

What is claimed is:—

1. A device of the class described comprising a receptacle open at the ends and with the sides converging toward one end, a foraminous diaphragm supported detachably within the casing at its smaller end, a plunger operating within the casing and smaller in diameter than the smaller end of the same, and a yieldable member carried by the plunger and bearing against the converging sides of the receptacle, and means for moving said plunger toward said diaphragm, whereby the resistance between the plunger and the casing increases as the plunger approaches the diaphragm.

2. A device of the class described comprising a receptacle open at the ends and with the sides converging toward one end, the smaller end of the receptacle being formed with an inwardly directed annular rib, a detachable member supported upon said rib, a plunger movable in said casing and of less diameter than the smallest end of the same, a yieldable member carried by said plunger and bearing against the converging sides of the receptacle, and means for moving said plunger toward the detachable member, whereby the resistance of the yieldable member is increased as the plunger approaches the detachable member.

In testimony whereof, I affix my signature, in presence of two witnesses.

WILLIAM H. GEBAUER.

Witnesses:
 HENRY J. SCHMICKLER,
 EDW. A. LUBELEY.